United States Patent

Bailey

Patent Number: 5,713,597
Date of Patent: Feb. 3, 1998

[54] METHOD AND APPARATUS FOR STORING FLUID UNDER PRESSURE

[75] Inventor: Todd R. Bailey, Higley, Ariz.

[73] Assignee: TRW Inc., Lyndhurst, Ohio

[21] Appl. No.: 635,497

[22] Filed: Apr. 22, 1996

[51] Int. Cl.$^6$ ................................................. B60R 21/28
[52] U.S. Cl. ................................................. 280/741; 280/735
[58] Field of Search ........................... 280/735, 737, 280/736, 741; 102/200, 530, 206, 215

[56] References Cited

U.S. PATENT DOCUMENTS

| | | | |
|---|---|---|---|
| 3,822,895 | 7/1974 | Ochiai | 280/150 |
| 4,990,884 | 2/1991 | McCurdy et al. | 340/438 |
| 5,348,344 | 9/1994 | Blumenthal et al. | 280/737 |
| 5,398,965 | 3/1995 | Giurlando et al. | 280/735 |
| 5,428,988 | 7/1995 | Starkovich | 73/40 |
| 5,429,387 | 7/1995 | Clark et al. | 280/737 |
| 5,470,104 | 11/1995 | Smith et al. | 280/737 |
| 5,496,062 | 3/1996 | Rink et al. | 280/737 |
| 5,584,505 | 12/1996 | O'loughlin | 280/737 |

OTHER PUBLICATIONS

Rosenthal et al., National Aeronautics and Space Administration, Technical Report 32-1494, *Nondestructive Testing of Insensitive Electroexplosive Devices by Transient Techniques*, Jet Propulsion Laboratory, California Institute of Technology, Pasadena, California, 1970.

*Primary Examiner*—Brian L Johnson
*Assistant Examiner*—Jonathan E. Butts
*Attorney, Agent, or Firm*—Tarolli, Sundheim, Covell, Tummino & Szako

[57] ABSTRACT

Inflation fluid (18) for an inflatable vehicle occupant protection device, such as an air bag (12), is contained in a pressure vessel (30) at an elevated storage pressure. The pressure vessel (30) further contains ignitable material (18) which, when ignited, heats the inflation fluid (18). An ohmic heating element (92) is maintained in an ignitable heat transferring relationship with the ignitable material (18) under the influence of the storage pressure. When the vehicle experiences a predetermined collision-indicating condition, an actuating level of electric current is directed through the heating element (92) to ignite the ignitable material (18). The storage pressure is monitored by monitoring an electrical characteristic, such as the resistance, of the heating element (92) which has a predetermined relationship to the storage pressure.

11 Claims, 3 Drawing Sheets

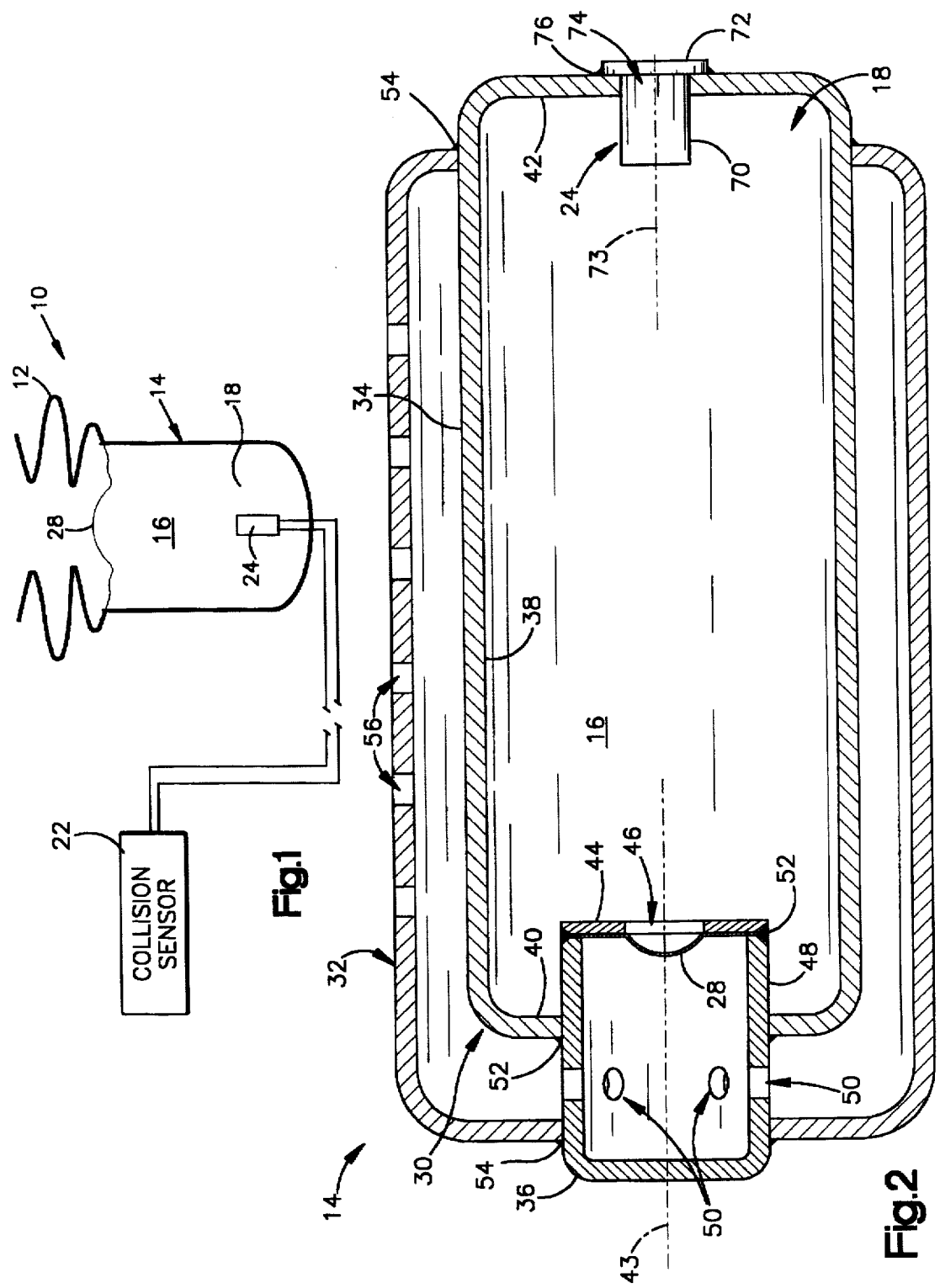

METHOD AND APPARATUS FOR STORING FLUID UNDER PRESSURE

FIELD OF THE INVENTION

The present invention relates to storage of fluid under pressure, and particularly relates to storage of pressurized inflation fluid for an inflatable vehicle occupant protection device.

BACKGROUND OF THE INVENTION

An apparatus for inflating a vehicle occupant protection device, such as an air bag, includes an inflator. The inflator may include a pressure vessel for containing inflation fluid at an elevated storage pressure. Such an inflator is disclosed in U.S. Pat. No. 5,428,988, assigned to TRW Vehicle Safety Systems Inc. In the inflator disclosed in the '988 patent, the inflation fluid is an ingredient in a mixture of gases. The mixture of gases further includes a fuel gas which, when ignited, heats the inflation fluid.

The inflator has an igniter which is actuated when the air bag is to be inflated. When the igniter is actuated, it ignites the fuel gas in the pressure vessel. The fluid pressure inside the pressure vessel is increased by the heat generated upon combustion of the fuel gas. When the increasing fluid pressure reaches a predetermined elevated level, the pressure vessel is opened. The inflation fluid then flows outward from the pressure vessel and into the air bag to inflate the air bag.

The apparatus disclosed in the '988 patent further includes an electrically conductive sensor element located outside the pressure vessel. The electrical resistance of the sensor element varies if the sensor element becomes exposed to the mixture of gases. The electrical resistance of the sensor element can thus indicate that the mixture of gases has leaked from the pressure vessel.

SUMMARY OF THE INVENTION

The present invention comprises a method and apparatus for storing pressurized inflation fluid for an inflatable vehicle occupant protection device.

In accordance with the present invention, a pressure vessel contains inflation fluid at an elevated storage pressure. The pressure vessel also contains ignitable material which, when ignited, heats the inflation fluid. An ohmic heating element is maintained in an ignitable heat transferring relationship with the ignitable material under the influence of the storage pressure of the inflation fluid.

When the vehicle experiences a predetermined collision-indicating condition, an actuating level of electric current is directed through the heating element to ignite the ignitable material. Before actuation, the storage pressure of the inflation fluid is monitored by monitoring an electrical characteristic of the heating element which has a predetermined relationship to the storage pressure.

In a first embodiment of the present invention, the inflation fluid is an ingredient of a mixture of gases contained in the pressure vessel at the elevated storage pressure. The ignitable material is a fuel gas, and also is an ingredient of the mixture of gases. The heating element is immersed in the mixture of gases. The heating element is thus maintained in an ignitable heat transferring relationship with the fuel gas under the influence of the storage pressure. Accordingly, when the heating element is resistively heated by a monitoring level of electric current, the temperature attained by the heating element is determined in part by the storage pressure. Since the electrical resistance of the heating element is determined in part by the temperature of the heating element, the electrical resistance can indicate the storage pressure. The storage pressure of the mixture of gases is thus monitored in accordance with the present invention by monitoring the electrical resistance of the heating element upon the passage of a monitoring level of electric current through the heating element.

In a second embodiment of the present invention, the ignitable material is a quantity of ignitable powder. The powder is consolidated under the influence of the storage pressure of the inflation fluid. The heating element adjoins the powder in an ignitable heat transferring relationship which varies with the consolidation of the powder. When a monitoring level of electric current is directed through the heating element, the temperature attained by the heating element indicates the consolidation of the powder. Accordingly, the electrical resistance of the heating element indicates the storage pressure of the inflation fluid.

In each preferred embodiment of the present invention, the resistance of the heating element is monitored with reference to the voltage developed across the heating element by the monitoring level of current. An alarm indicator, such as a lamp on the vehicle instrument panel, is actuated when the voltage developed across the heating element indicates that the resistance of the heating element is below a predetermined threshold level. The threshold level of resistance corresponds to a predetermined minimum acceptable level of fluid pressure in the pressure vessel.

BRIEF DESCRIPTION OF THE DRAWINGS

Further features of the present invention will become apparent to those skilled in the art to which the present invention relates from reading the following description with reference to the accompanying drawings, in which:

FIG. 1 is a schematic view of a vehicle occupant protection apparatus comprising a first embodiment of the present invention;

FIG. 2 is a sectional view of an inflator included in the apparatus of FIG. 1;

DESCRIPTION OF PREFERRED EMBODIMENT

Figure 3:
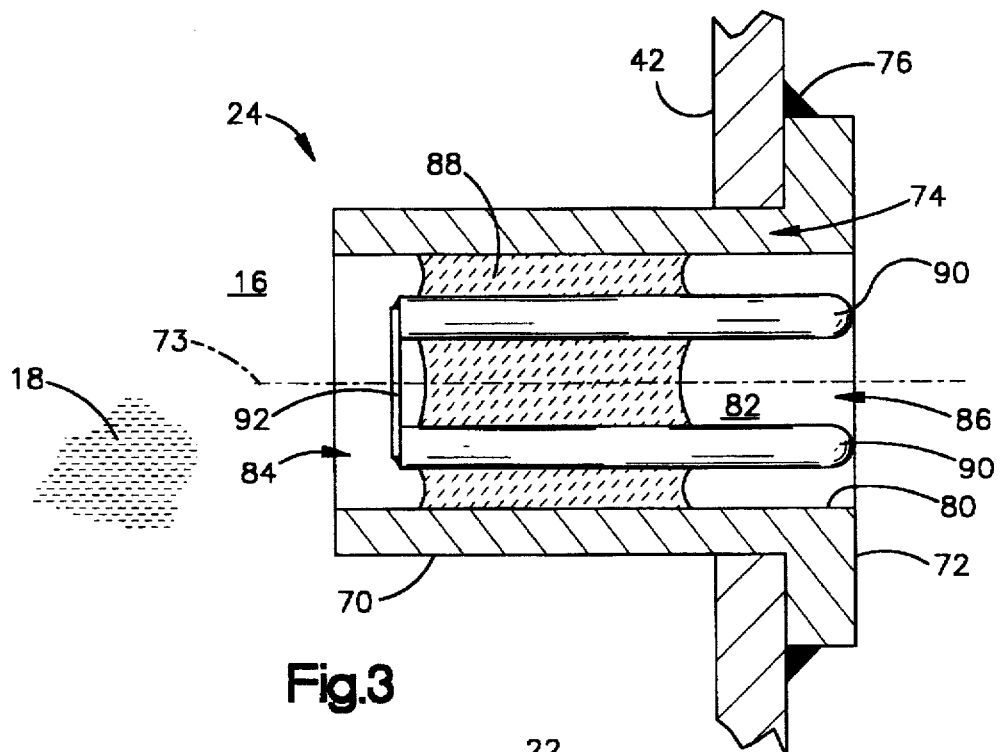
FIG. 3 is an enlarged sectional view of parts shown in FIG. 2.

A vehicle occupant protection apparatus 10 comprising a first embodiment of the present invention is shown schematically in FIG. 1. The apparatus 10 includes a particular type of inflatable vehicle occupant protection device 12 which is commonly referred to as an air bag. The apparatus 10 further includes an inflator 14 for inflating the air bag 12. Other inflatable vehicle occupant protection devices that can be used in accordance with the present invention include inflatable seat belts, inflatable knee bolsters, inflatable head liners, and knee bolsters operated by inflatable air bags.

The inflator 14 has a storage chamber 16 which holds combustible fluid 18. The combustible fluid 18 preferably comprises a combustible mixture of gases, and most preferably comprises a combustible mixture of gases in accordance with the invention set forth in U.S. Pat. No. 5,348,344, assigned to TRW Vehicle Safety Systems Inc. Accordingly, the combustible fluid 18 in the first embodiment of the present invention comprises a homogeneous mixture of gases which preferably includes a fuel gas, an oxidizer gas for supporting combustion of the fuel gas, and an inert gas. The inert gas is preferably nitrogen, argon, or a mixture of nitrogen and argon. The oxidizer gas is preferably oxygen. The fuel gas is preferably hydrogen. Examples of other fuel gases are hydrocarbons, such as methane, and mixtures of hydrogen and one or more hydrocarbons.

The mixture 18 of gases in the storage chamber 16 readily combusts when ignited, but otherwise is not explosive. As such, the mixture 18 of gases could have any one of many different compositions. For example, the fuel gas may be 2 to 16 molar percent of the mixture 18 of gases, with the oxidizer gas being 7 to 98 molar percent of the mixture 18 of gases, and with the balance being inert gas at 0 to 91 molar percent of the mixture 18 of gases. Preferably, such a mixture 18 of gases includes 10–14 molar percent hydrogen, 15–25 molar percent oxygen, and 61–75 molar percent inert gas. Moreover, the mixture 18 of gases in the storage chamber 16 may comprise an oxidizer gas and a fuel gas in amounts which provide a very fuel lean mixture, i.e., a mixture in which the amount of oxidizer gas exceeds that amount required to support combustion of the fuel gas.

In another example, the mixture 18 of gases is dry air and hydrogen. The mixture of dry air and hydrogen may range from 86 molar percent air and 14 molar percent hydrogen to 92 molar percent air and 8 molar percent hydrogen. However, in such a mixture it is preferred to have a range from 90 molar percent air and 10 molar percent hydrogen to 87 molar percent air and 13 molar percent hydrogen.

The mixture 18 of gases in the storage chamber 16 is normally stored under pressure. The storage pressure depends upon such factors as the volume of the air bag 12 or other inflatable device to be inflated, the time available for inflation, the inflation pressure desired, the volume of the storage chamber 16, and the percentage of each of the gases in the mixture 18 of gases. Normally, the mixture 18 of gases in the storage chamber 16 may be at a storage pressure of approximately 500 to approximately 5,000 pounds per square inch (psi).

Although the mixture 18 of gases in the preferred embodiments of the present invention is stored as a whole in the storage chamber 16, ingredients of the mixture 18 could alternatively be stored separately, with the mixture 18 being created by mixing the ingredients when the inflator 14 is actuated. For example, as disclosed in U.S. Pat. No. 5,348,344, a fuel gas and an oxidizer gas could be stored separately from an inert gas, and could be mixed with the inert gas upon actuation of the corresponding inflator.

The apparatus 10 further includes a collision sensor 22 and an electrically actuatable igniter 24. As known in the art, the collision sensor 22 monitors vehicle conditions to sense a vehicle condition indicating the occurrence of a collision. The collision-indicating condition may comprise, for example, sudden vehicle deceleration that is caused by a collision. If the collision-indicating condition is at or above a predetermined threshold level, it indicates the occurrence of a collision having at least a predetermined threshold level of severity. The threshold level of collision severity is a level at which inflation of the air bag 12 is desired to help protect an occupant of the vehicle. The collision sensor 22 then directs electric current to flow through the igniter 24 to actuate the igniter 24.

When the igniter 24 is actuated, it ignites the fuel gas in the mixture 18 of gases. The resulting combustion of the fuel gas is supported by the oxidizer gas. As the fuel gas burns, the pressure in the storage chamber 16 rises due to warming of the gases by the heat of combustion created by burning of the fuel gas. After a predetermined time, or when a predetermined pressure is reached in the storage chamber 16, a rupturable closure wall 28 of the inflator 14 bursts open. The warm gas is thus released to flow outward from the storage chamber 16 and into the air bag 12 to inflate the air bag 12.

If the amount of hydrogen in the mixture 18 of gases is less than about 8 molar percent, difficulty may be encountered in igniting the hydrogen. Preferably, the fuel gas is included in the mixture 18 of gases in an amount so that it is substantially consumed by combustion in the storage chamber 16. The air bag 12 is thus inflated almost exclusively, in the case where inert gas is used, by inert gas, combustion products created by burning of the fuel gas, and any remaining oxidizer gas. In the case where inert gas is not used, the air bag 12 is inflated almost exclusively by combustion products and the remaining oxidizer gas.

The warm inflation gas expands and cools as it flows from the inflator 14 into the air bag 12. In addition, air from the environment of the apparatus 10 may be aspirated into the air bag 12 as the air bag 12 is being inflated. This aspirated air will also cool the inflation gas.

As shown in greater detail in FIG. 2, the inflator 14 preferably comprises a pressure vessel 30 and a diffuser 32. As an example of a pressure vessel that can be used in accordance with the present invention, the pressure vessel 30 includes a tank 34 and a manifold 36. The tank 34 has an elongated cylindrical body wall 38 and a pair of circular opposite end walls 40 and 42, each of which is centered on a longitudinal central axis 43. The manifold 36 also is cylindrical, and extends closely through a circular opening at the center of the first end wall 40 of the tank 34. A circular end wall 44 of the manifold 36 is located inside the tank 34. The end wall 44 has a centrally located control orifice 46. A cylindrical side wall 48 of the manifold 36 has a circumferentially extending array of gas flow openings 50 located outside the tank 34. The rupturable closure wall 28, which is shown schematically in FIG. 1, is a burst disk supported inside the manifold 36 between the control orifice 46 and the gas flow openings 50.

The walls 38–42 of the tank 34, the walls 44 and 48 of the manifold 36, and the closure wall 28 together define the volume of the storage chamber 16 in which the mixture 18 of gases is contained under pressure. Those portions of the pressure vessel 30 are preferably formed of metal, such as steel or aluminum, and welds 52 are provided to seal the storage chamber 16 around the periphery of the manifold 36. The pressure vessel 30 could be formed of an alternative material, such as a composite plastic material, with the storage chamber 16 being sealed by any suitable alternative sealing structure known in the art.

In the preferred embodiments of the present invention, the diffuser 32 also is formed of metal, and is fixed to the pressure vessel 30 by corresponding welds 54. A plurality of gas outlet openings 56 extend through the diffuser 32 in an array located at one side of the diffuser 32.

As shown in FIG. 2, the igniter 24 is a cylindrical part with a tubular wall 70 and a flat, annular flange 72, each of which is centered on an axis 73. The tubular wall 70 extends closely through a circular opening 74 at the center of the second end wall 42 of the tank 34. The flange 72 projects radially outward from one end of the tubular wall 70, and abuts the second end wall 42 of the tank 34 radially outward of the opening 74. A circumferentially extending weld 76 fixes the igniter 24 to the second end wall 42 at the periphery of the flange 72. The weld 76 blocks the mixture of gases 18 in the storage chamber 16 from leaking outward through the opening 74.

As shown in greater detail in FIG. 3, the tubular wall 70 of the igniter 24 has a cylindrical inner surface 80 centered on the axis 73. The cylindrical inner surface 80 defines an elongated cylindrical passage 82 with axially inner and outer ends 84 and 86. A glass seal 88 is located in the passage 82. The glass seal 88 supports a pair of electrodes 90 in positions that are spaced from each other and from the surrounding cylindrical surface 80. Preferably, the glass seal 88 is bonded to the adjoining surfaces of the electrodes 90, and to the adjoining portion of the surrounding cylindrical surface 80, so as to define a hermetic seal between the opposite ends 84 and 86 of the passage 82.

The igniter 24 further includes an ohmic (resistive) heating element in the form of a bridgewire 92. The bridgewire 92 extends between the electrodes 90 at a location axially between the glass seal 88 and the inner end 84 of the passage 82. Since the inner end 84 of the passage 82 is open to the storage chamber 16, as shown in FIG. 3, the bridgewire 92 is immersed in the mixture 18 of gases in the storage chamber 16, and is thus immersed in the fuel gas in the mixture 18 of gases.

The bridgewire 92 is preferably formed of metal material which is non-catalytic. By "non-catalytic" it is meant that the material is free of any metal which would function catalytically to initiate spontaneous ignition of the fuel gas in which the bridgewire 92 is immersed. In the preferred embodiments of the present invention, the bridgewire 92 is thus formed of metal material which is free of any one or more of the noble metal elements to preclude the possibility of spontaneous ignition of the fuel gas in the mixture 18 of gases. The metal material of which the bridgewire 92 is formed may otherwise have any suitable composition known in the art, but preferred materials include alloys of stainless steel, tungsten, and nickel-chromium. A wire formed of such a metal material can be obtained from sources such as Molecu-Wire Corporation of Farmingdale, N.J.; California Fine Wire Company of Grover City, Calif.; and HP Reid Company, Inc. of Neptune, N.J.

As described above, the igniter 24 is actuated electrically when the collision sensor 22 senses a collision-indicating condition that is above a predetermined threshold level. Electric current is then directed through the igniter 24 between the electrodes 90. As the electric current is conducted through the bridgewire 92 between the electrodes 90, the bridgewire 92 resistively generates heat which is transferred directly to the mixture 18 of gases in which the bridgewire 92 is immersed. The bridgewire 92 preferably conducts a sufficient electric current for a sufficient time to reach an elevated temperature at which it fuses, i.e., melts. Most preferably, the elevated temperature is high enough for the bridgewire 92 to form a high temperature plasma. As a result, the fuel gas in the mixture 18 of gases is ignited by the bridgewire 92.

When the fuel gas in the mixture 18 of gases is ignited by the bridgewire 90, combustion of the fuel gas generates heat which increases the pressure in the storage chamber 16. When the increasing pressure in the storage chamber 16 reaches a predetermined elevated level, the closure wall 28 (FIG. 2) bursts open. Pressurized gas then flows from the storage chamber 16 through the manifold 36 to the gas outlet openings 56 in the diffuser 32, and through the outlet openings 56 into the air bag 12 (FIG. 1). Since the bridgewire 92 is immersed in the mixture 18 of gases, it is subjected to the storage pressure of the mixture 18 of gases. The bridgewire 92 is thus maintained in an ignitable heat transferring relationship with the mixture 18 of gases under the influence of the storage pressure. Therefore, if leakage from the container 30 causes the storage pressure to decrease, the mixture 18 of gases will conduct a lesser amount of heat from the bridgewire 92 than it otherwise would for a given amount of ohmic heating of the bridgewire 92. This would cause a corresponding increase in the temperature of the bridgewire 92. The increase in temperature would cause a corresponding decrease in the electrical resistance of the bridgewire 92. Accordingly, a decrease in the resistance of the bridgewire 92 can indicate a decrease in the storage pressure as a result of leakage from the container 30. In the same manner, an increase in the resistance of the bridgewire 92 can indicate an increase in the storage pressure. This could result from an increase in the ambient temperature.

Figure 4:
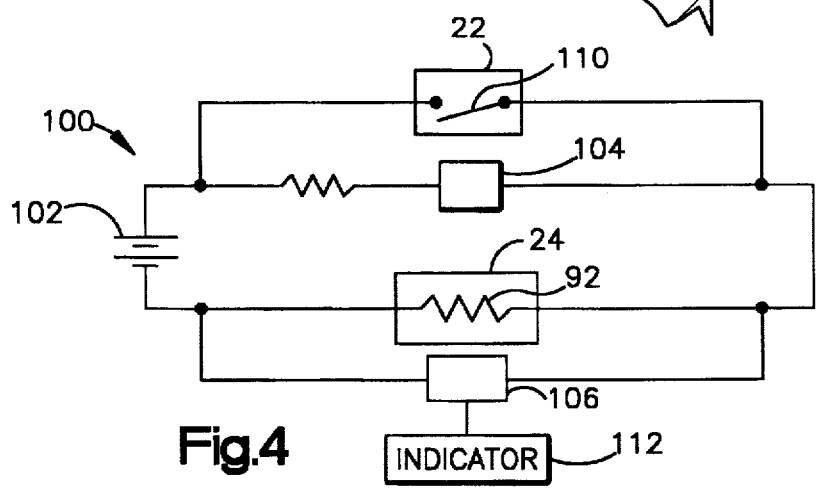
FIG. 4 is a schematic view of an electrical circuit including parts shown in FIG. 3.

In accordance with the foregoing feature of the present invention, the igniter 24 is included in an electrical circuit 100 (FIG. 4) which functions to monitor the storage pressure of the mixture 18 of gases by monitoring the resistance of the bridgewire 92. As shown schematically in FIG. 4, the electrical circuit 100 further includes a power source 102, the collision sensor 22 (FIG. 1), a timing circuit 104, and a voltage monitoring circuit 106.

The power source 102 is preferably the vehicle battery and/or a capacitor. The collision sensor 22 is a known part which includes a normally open switch 110. When the collision sensor 22 senses a collision-indicating condition at or above the predetermined threshold level, as described above with reference to FIG. 1, the switch 110 closes to direct an actuating level of electric current through the bridgewire 92 in the igniter 24. The actuating level of current causes ohmic heating of the bridgewire 92 which is sufficient to ignite the fuel gas in the mixture 18 of gases.

The timing circuit 104 is connected in parallel with the switch 110 and functions to direct a monitoring level of electric current through the bridgewire 92. The monitoring level of current causes ohmic heating of the bridgewire 92 which is not sufficient to ignite the fuel gas in the mixture 18 of gases. Instead, the ohmic heating caused by the monitoring level of current is sufficient only to indicate the heat transferring relationship of the bridgewire 92 with the mixture 18 of gases in accordance with the present invention.

The timing circuit 104 may have any suitable structure known in the art. For example, the timing circuit 104 may include a timer for controlling a relay through successive on-off periods, as disclosed in U.S. Pat. No. 5,428,988, assigned to TRW Vehicle Safety Systems Inc. The timing circuit 104 allows the monitoring level of current to flow from the power source 102 to the bridgewire 92 intermittently while the switch 110 in the collision sensor 22 remains open. The successive on-off periods may have any duration suitable for monitoring the storage pressure of the mixture 18 of gases.

The voltage monitoring circuit 106 is connected in parallel with the bridgewire 92 and functions to measure the voltage intermittently developed across the bridgewire 92 by the monitoring level of current. Like the timing circuit 104, the voltage monitoring circuit 106 may have any suitable structure known in the art. Such a circuit is disclosed, for example, in U.S. Pat. No. 4,990,884, assigned to TRW Inc.

The storage pressure of the mixture 18 of gases may fluctuate within a range of acceptable levels, and has a predetermined minimum acceptable level. The bridgewire 92 has a predetermined threshold level of resistance which corresponds to the minimum acceptable level of fluid pressure. An alarm indicator 112, such as a lamp on the vehicle instrument panel, is actuated by the voltage monitoring circuit 106 when the voltage developed across the bridgewire 92 by the monitoring level of current indicates that the resistance of the bridgewire 92 is less than the predetermined threshold level. The alarm indicator 112 thus alerts a vehicle occupant when the storage pressure of the mixture 18 of gases has decreased to an unacceptable level as a result of leakage from the container 30.

Figure 5:
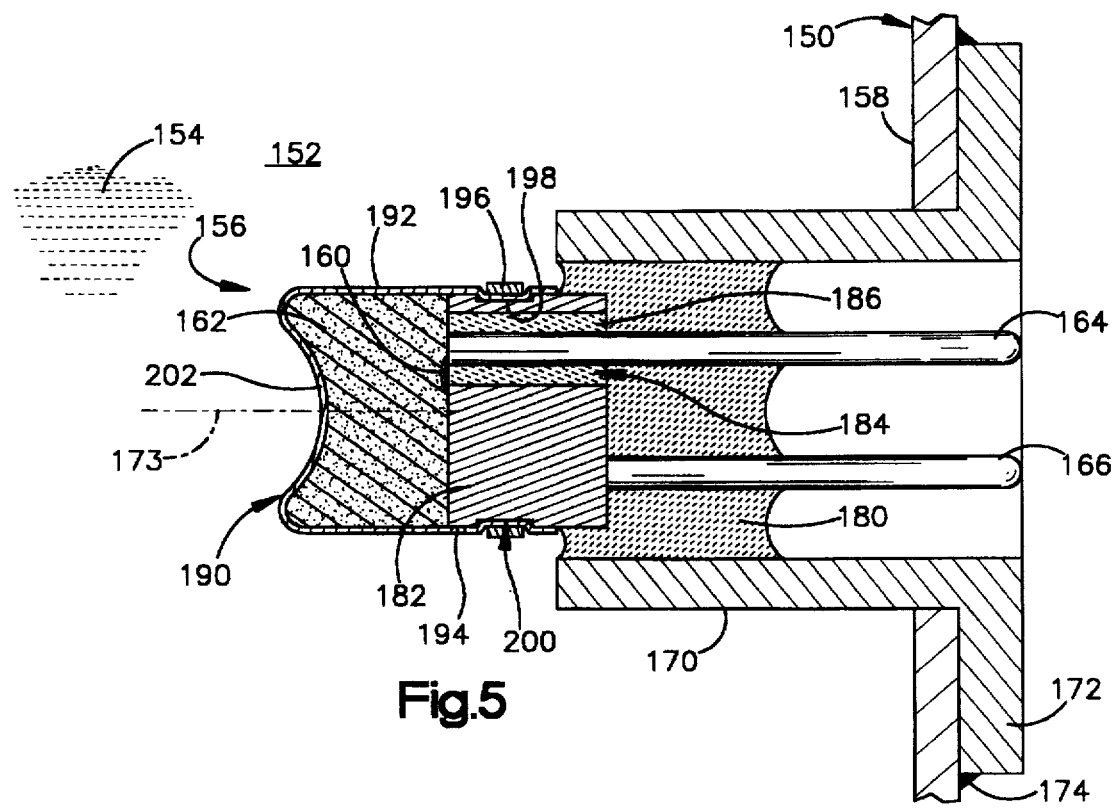
FIG. 5 is a partial view of parts of a vehicle occupant protection apparatus comprising a second embodiment of the present invention.

A second embodiment of the present invention is shown partially in FIG. 5. The partial view of the second embodiment shown in FIG. 5 corresponds with the partial view of the first embodiment shown in FIG. 3. The second embodiment is thus shown to include a pressure vessel 150 with a storage chamber 152. The storage chamber 152 contains a pressurized quantity of combustible fluid 154 like the combustible fluid 18 described above.

An igniter 156 projects into the storage chamber 152 from an end wall 158 of the pressure vessel 150. Like the igniter 24 described above, the igniter 156 has an ohmic heating element 160 in the form of a bridgewire. However, unlike the bridgewire 92 described above, the bridgewire 160 is not immersed in the combustible fluid 154. Instead, the bridgewire 160 adjoins, and is preferably embedded in, an ignition charge 162 in an ignitable heat transferring relationship with the ignition charge 162.

The ignition charge 162 is a quantity of pyrotechnic or other ignitable material in powder form. A preferred material for the ignition charge is zirconium potassium perchlorate. When the bridgewire 160 is heated resistively upon the passage of electric current through the igniter 156 between a pair of electrodes 164 and 166, it ignites the ignition charge 162. The ignition charge 162 then produces combustion products which, in turn, ignite the combustible fluid 154.

The igniter 156 has a tubular wall 170 and a flat annular flange 172 centered on an axis 173. A circumferentially extending weld 174 fixes and seals the igniter 156 to the end wall 158 of the pressure vessel 150 at the periphery of the flange 172. A glass seal 180 supports a header 182 within the tubular wall 170. The header 182 is preferably formed of stainless steel.

The first electrode 164 extends through a passage 184 in the header 182, and is insulated from the header 182 by a surrounding sleeve 186. The sleeve 186 is formed of an electrically non-conductive material such as, for example, glass or manganese zinc ferrite. The second electrode 166 abuts the header 182, and is preferably fixed to the header 182 by brazing or the like. The bridgewire 160 bridges the first electrode 164 and the header 182 to complete an electrical current path through the igniter 156 between the electrodes 164 and 166.

An ignition cup 190 contains the ignition charge 162 at the inner end of the igniter 156. The ignition cup 190 is formed of thin, flexible sheet metal which is ruptured by the combustion products of the ignition charge 162 when the ignition charge 162 is ignited. A cylindrical body wall 192 of the ignition cup 190 extends partially over a cylindrical outer surface 194 of the header 182. A locking ring 196 retains a crimped portion 198 of the body wall 192 in a circumferentially extending groove 200 at the outer surface 194. The ignition charge 162 is thus contained and sealed within the ignition cup 190 axially between the header 182 and a circular end wall 202 of the ignition cup 190.

Figure 6:
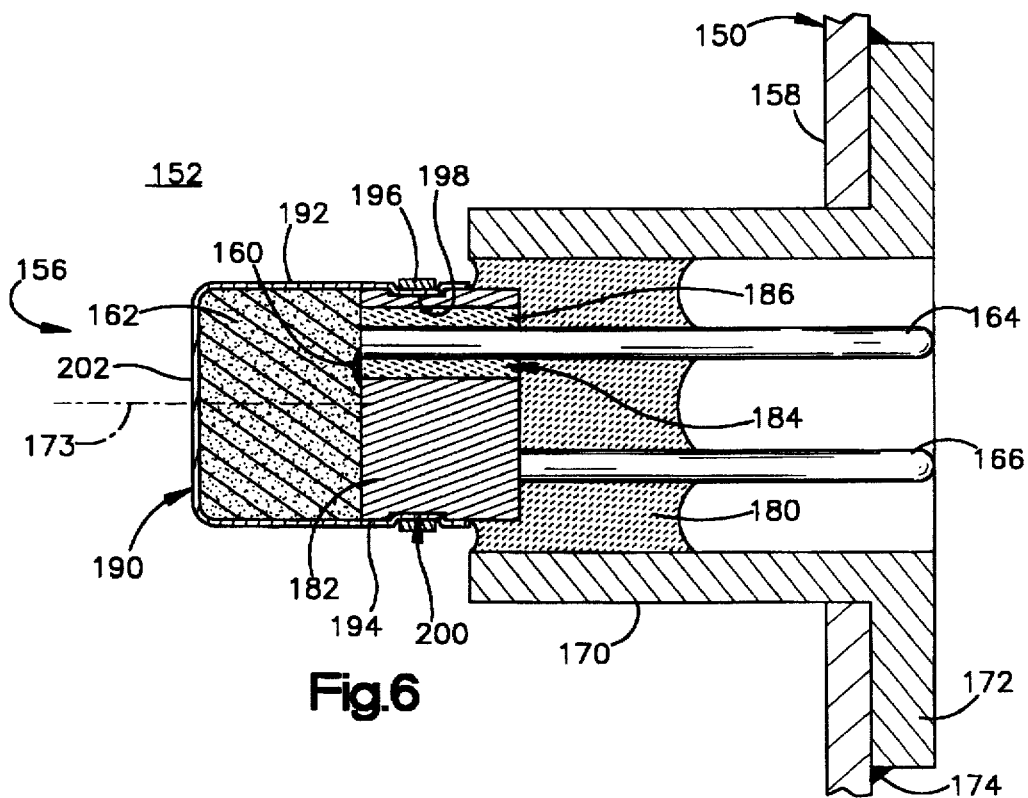
FIG. 6 is a view similar to FIG. 5 showing parts in different positions.

The end wall 202 of the ignition cup 190 functions as a diaphragm which deflects axially under the influence of the fluid pressure in the storage chamber 152. For example, the end wall 202 initially has an undeflected condition in which it is planar and perpendicular to the axis 173, as shown in FIG. 6. When the storage chamber 152 is being filled with the combustible fluid 154, the increasing fluid pressure deflects the end wall 202 axially inward, i.e. in a direction extending from left to right in the drawings, from the undeflected condition of FIG. 6 toward the deflected condition of FIG. 5. The end wall 202 then applies a compressive force to the ignition charge 162 which causes the ignition charge 162 to become consolidated within the ignition cup 190. For a given amount of ohmic heating of the bridgewire 160, the amount of heat that the ignition charge 162 can conduct from the bridgewire 160 increases as the consolidation of the ignition charge 162 increases in this manner.

When the storage chamber 152 has been filled with the combustible fluid 154 at a typical storage pressure of approximately 500 to approximately 5000 psi, the pressure maintains the end wall 202 of the ignition cup 190 in the deflected condition of FIG. 5 against an elastic bias of the sheet metal material. If leakage from the pressure vessel 150 causes the fluid pressure in the storage chamber 152 to decrease, the bias of the sheet metal material will move the end wall 202 axially outward from the deflected condition of FIG. 5 toward the undeflected condition of FIG. 6. The compressive force applied to the ignition charge 162 by the end wall 202 will decrease accordingly. The consolidation of the ignition charge 162 will decrease in a corresponding amount. Therefore, if leakage from the container 150 causes the fluid pressure in the storage chamber 152 to decrease, the ignition charge 162 will conduct a lesser amount of heat from the bridgewire 160 than it otherwise would for a given amount of ohmic heating of the bridgewire 160.

Figure 7:
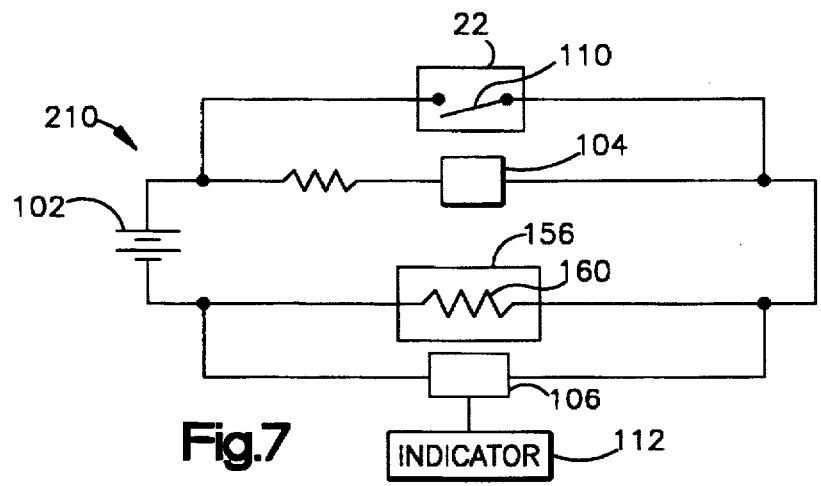
FIG. 7 is a schematic view of an electrical circuit including parts shown in FIG. 5.

As shown schematically in FIG. 7, the igniter 156 is included in an electrical circuit 210. As indicated by the use of the same reference numbers in FIGS. 4 and 7, the electrical circuit 210 includes other parts that are substantially the same as corresponding parts of the electrical circuit 100 in the first embodiment of the present invention. The circuit 210 thus includes a power source 102 and a collision sensor 22 with a normally open switch 110. The circuit 210 further includes a timing circuit 104 for intermittently directing a monitoring level of electric current through the bridgewire 160, and a voltage monitoring circuit 106 with an alarm indicator 112 for measuring and indicating the voltage intermittently developed across the bridgewire 160 by the monitoring level of current.

For a given amount of ohmic heating of the bridgewire 160, the temperature of the bridgewire 160 indicates the degree to which the ignition charge 162 is consolidated and maintained in an ignitable heat transferring relationship with the bridgewire 160. The temperature, and hence the electrical resistance, of the bridgewire 160 thus indicates the pressure at which the combustible fluid 154 is contained in the storage chamber 152. The voltage monitoring circuit 106 actuates the alarm indicator 112 when the voltage developed across the bridgewire 160 by the monitoring level of current indicates that the resistance of the bridgewire 160 is less than a predetermined threshold level. The alarm indicator 112 thus alerts a vehicle occupant when the storage pressure of the combustible fluid 154 has decreased to an unacceptable level as a result of leakage from the container 150.

From the above description of the invention, those skilled in the art will perceive improvements, changes and modifications. Such improvements, changes and modifications within the skill of the art are intended to be covered by the appended claims.

Having described the invention, the following is claimed:

1. A method of storing pressurized inflation fluid for an inflatable vehicle occupant protection device, said method comprising the steps of:

containing inflation fluid in a pressure vessel at an elevated storage pressure;

containing ignitable material in said pressure vessel with said inflation fluid;

maintaining an ohmic heating element in a heat transferring relationship with said ignitable material in said pressure vessel under the influence of said storage pressure, said heat transferring relationship being such that variations in said storage pressure cause variations in said heat transferring relationship which, in turn, cause corresponding variations in the temperature, and thereby in the electrical resistance, of said heating element when said heating element conducts a monitoring level of electric current;

monitoring vehicle conditions in readiness to direct an actuating level of electric current through said heating element to ignite said ignitable material in response to a predetermined collision-indicating condition; and monitoring said storage pressure by directing said monitoring level of electric current through said heating element and by monitoring said variations in said resistance of said heating element.

2. A method as defined in claim 1 wherein said monitoring level of electric current is intermittently directed through said heating element, said variations in said resistance being monitored by measuring voltage intermittently developed across said heating element by said monitoring level of electric current.

3. A method as defined in claim 1 wherein said ignitable material comprises fuel gas at said storage pressure, said actuating level of electric current causing said heating element to generate thermal energy sufficient to ignite said fuel gas.

4. A method as defined in claim 1 wherein said ignitable material comprises a quantity of powder which is consolidated under the influence of said storage pressure, said actuating level of electric current causing said heating element to generate thermal energy sufficient to ignite said powder.

5. Apparatus for storing pressurized inflation fluid for an inflatable vehicle occupant protection device, said apparatus comprising:

a pressure vessel containing inflation fluid at an elevated storage pressure, said pressure vessel further containing ignitable material which, when ignited, heats said inflation fluid;

an electrical circuit including an ohmic heating element and means for directing a monitoring level of electric current through said ohmic heating element;

said ohmic heating element being maintained in a heat transferring relationship with said ignitable material in said pressure vessel under the influence of said storage pressure, said heat transferring relationship being such that variations in said storage pressure cause variations in said heat transferring relationship which, in turn, cause corresponding variations in the temperature, and thereby in the electrical resistance, of said heating element when said heating element conducts said monitoring level of electric current;

said circuit including means for responding to a predetermined vehicle collision-indicating condition by directing an actuating level of electric current through said heating element to ignite said ignitable material; and said circuit further including means for monitoring said storage pressure by monitoring said variations in said resistance of said heating element.

6. Apparatus as defined in claim 5 wherein said monitoring means intermittently directs said monitoring level of electric current through said heating element and measures voltage intermittently developed across said heating element by said monitoring level of current.

7. Apparatus as defined in claim 5 wherein said ignitable material comprises fuel gas at said storage pressure, said heating element being immersed in said fuel gas in said heat transferring relationship.

8. Apparatus as defined in claim 5 wherein said ignitable material comprises a quantity of powder which is consolidated under the influence of said storage pressure, said heating element adjoining said powder in said heat transferring relationship.

9. Apparatus as defined in claim 8 further comprising a diaphragm which consolidates said powder under the influence of said storage pressure.

10. Apparatus as defined in claim 9 wherein said diaphragm comprises a flexible wall of an ignition cup containing said powder.

11. Apparatus as defined in claim 10 further comprising a header supporting a pair of electrodes, said heating element comprising a bridgewire extending from one of said electrodes to said header, said ignition cup extending partially over said header and containing said powder between said header and said flexible wall.

* * * * *